A. J. SIGNOR.
MEANS FOR TRANSMITTING POWER.
APPLICATION FILED FEB. 10, 1912.
1,040,443.
Patented Oct. 8, 1912.
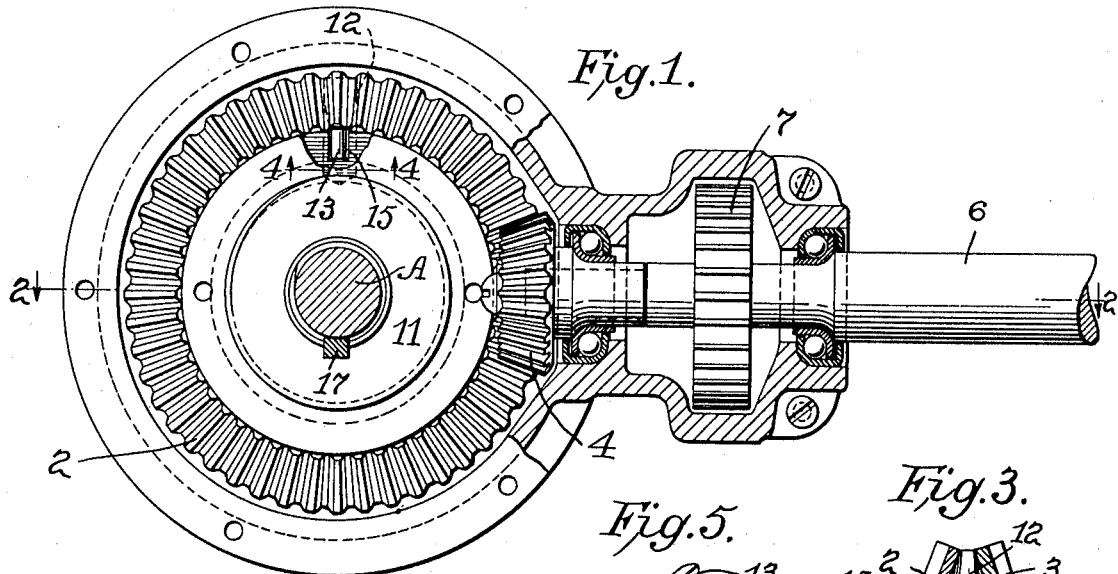
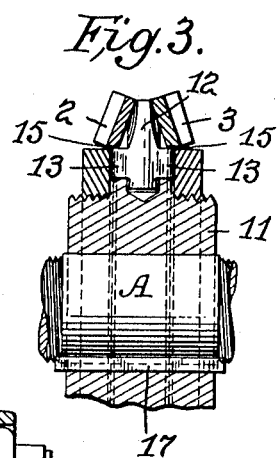
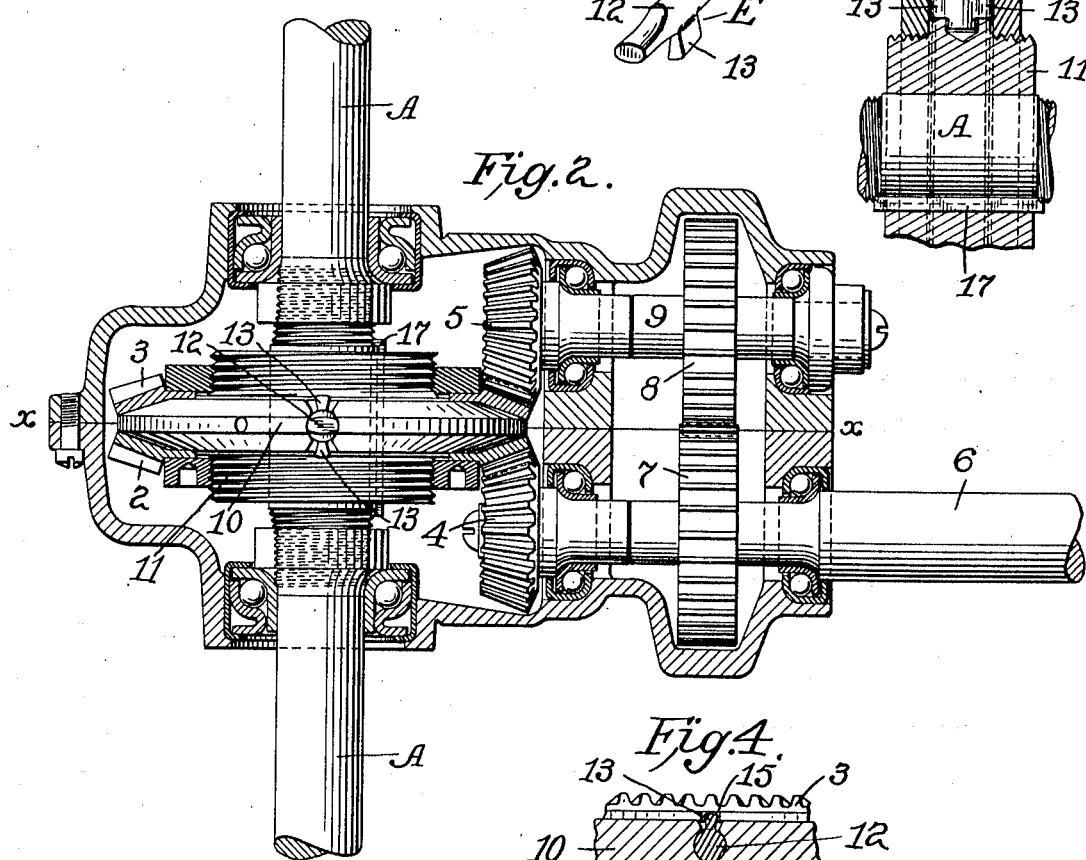
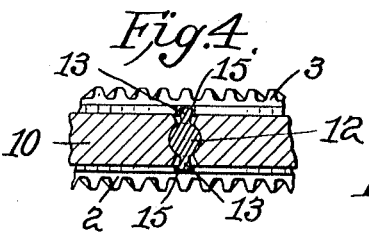
Attest:
Edw. L. Tolson.
H. M. Barrett.
Inventor:
Alfred J. Signor,
by Spear, Middleton, Donaldson & Spear,
Attys.

UNITED STATES PATENT OFFICE.

ALFRED J. SIGNOR, OF ELKHART, INDIANA.

MEANS FOR TRANSMITTING POWER.

1,040,443.  Specification of Letters Patent.  Patented Oct. 8, 1912.

Application filed February 10, 1912. Serial No. 676,910.

*To all whom it may concern:*

Be it known that I, ALFRED J. SIGNOR, citizen of the United States, residing at Elkhart, Indiana, have invented certain new and useful Improvements in Means for Transmitting Power, of which the following is a specification.

My invention, hereinafter described, relates to means for transmitting power from a main shaft to a second shaft, such as the axle of a motor car. Its object is to provide simple, cheap and effective means for such transmission.

It is illustrated in the accompanying drawings, in which,

Figure 1 shows my power transmitting mechanism in side elevation, and partly in section. Fig. 2, a similar plan view with parts in section on line 2—2. Figs. 3, 4 and 5 show details. Fig. 4 showing a section on line 4—4 of Fig. 1.

In the drawings the shaft or axle of the driving wheels is indicated by A, A. At or about the center of this axle are mounted annular gears 2 and 3, connected to the axle and with each other, as hereinafter described. These gears face outward. They are slightly beveled and mesh with bevel pinions 4 and 5. Gear 2 is in mesh with pinion 4, which is fixed on the inner end of the driving shaft 6. This shaft also carries a gear 7, in mesh with a gear 8 on the counter shaft 9, and this counter shaft carries the pinion 5 in mesh with gear 3, so that the power is applied to both sides of the drive gear wheel on the axle, and the pressure of each is opposed to the other. In order to equalize the pressure on the two gear wheels on the axle, I provide an equalizer interposed between these two gears.

The construction also includes the connection between the gears 2 and 3, and the shaft or axle A. The main part of this connection is a central flange or wheel 10, fixed on a threaded hub 11, which is keyed on the shaft or axle A, as indicated at 17 Figs. 1 and 3. The gears 2 and 3 are in the form of rings fitted loosely to the hub and its flange or wheel 10. These gears are beveled and are held to the hub by the annular nuts. The flange 10 is bored radially on one edge, as shown in Figs. 1, 2 and 3, to receive an equalizing connection E, shown detached in Fig. 5. This has a central shaft 12, and wings 13, 13, arranged radially of the axis on opposite sides. The shaft 12 fits loosely in the bore and is flattened on the outer end, to conform to the edge of the flange 10, as shown in Figs. 2 and 3.

The gears 2 and 3 are notched, as shown at 15, to admit the wings and permit them to work therein loosely with some slight but limited lost motion, in the movement of the mechanism. This will be understood from Fig. 4, and that the wings extend in like manner into both of the gears 2 and 3, so that when power is applied through the driving shaft 6, directly to gear 2, and indirectly on the other side to gear 3, the force will bear equally on the gears, and the work. This mechanism is inclosed in a two part case divided on planes indicated at *x—x* in Fig. 2. The bearings are formed in the case for the shaft or axle A, the driving shaft 6, and the counter shaft 9, as shown in Fig. 2. In the bearings I have also placed antifriction balls held in two part cases as clearly shown in Fig. 2. The casing is itself suspended on the shafts and holds the parts securely in place, and may contain the lubricant.

The mechanism is mainly designed for automobiles, and motor vehicles, but is applicable to similar uses.

I claim as my invention substantially as described:—

1. A power transmitting mechanism, comprising a driven shaft, a central hub fixed thereon, two gears held loosely thereon with limited movement, a driving shaft having a bevel pinion meshing directly with one gear, a counter shaft driven from said driving shaft, a gear on said counter shaft meshing with the other loose gear, and suitable bearings for said shafts.

2. A power transmitting mechanism, comprising a driven shaft, a central hub fixed thereon, having a flange, two gears held loosely thereon, an equalizing device connecting said flange and said gears, a driving shaft having a bevel pinion meshing directly with one gear, a counter shaft driven from said driving shaft, a gear on said counter shaft meshing with the other loose gear, and suitable bearings for said shafts.

In testimony whereof, I affix my signature in presence of two witnesses.

ALFRED J. SIGNOR.

Witnesses:
ETHAN L. ARNOLD,
FORREST E. HUGHES.